United States Patent [19]

Maucher

[11] Patent Number: 5,413,202
[45] Date of Patent: May 9, 1995

[54] FRICTION GENERATING TORQUE TRANSMITTING DEVICE

[75] Inventor: Paul Maucher, Sasbach, Germany

[73] Assignee: LuK Lamellen und Kupplungsbau GmbH, Bühl, Germany

[21] Appl. No.: 21,873

[22] Filed: Feb. 24, 1993

[30] Foreign Application Priority Data

Mar. 5, 1992 [DE] Germany .................. 42 06 880

[51] Int. Cl.⁶ ..................................... F16D 13/64
[52] U.S. Cl. ................... 192/107 C; 192/107 R; 192/52
[58] Field of Search ............ 192/107 C, 107 R, 52

[56] References Cited

U.S. PATENT DOCUMENTS

| 2,008,169 | 7/1935 | Blackmore et al. | 192/107 C X |
| 2,053,622 | 9/1936 | Manning | 192/107 C |
| 2,119,025 | 5/1938 | Reed | 192/107 C |
| 2,195,666 | 4/1940 | Wolfram | 192/52 X |
| 2,618,369 | 11/1952 | Zeidler | 192/107 C |
| 3,237,740 | 3/1966 | Wilson | 192/107 C |
| 4,058,027 | 11/1977 | Webb | 192/107 C X |
| 4,516,672 | 5/1985 | Caray | 192/107 C |
| 4,529,078 | 7/1985 | Keck | 192/107 C |
| 4,580,673 | 4/1986 | Graton | 192/107 C X |
| 4,697,683 | 10/1987 | Graton et al. | 192/107 C |

FOREIGN PATENT DOCUMENTS

| 828837 | 5/1938 | France | 192/107 C |
| 1233669 | 2/1967 | Germany . | |
| 477794 | 1/1938 | United Kingdom | 192/107 C |

*Primary Examiner*—Andrea L. Pitts
*Attorney, Agent, or Firm*—Darby & Darby

[57] ABSTRACT

A clutch plate wherein a hub carries and is surrounded by a disc which, in turn, carries and is surrounded by an annulus of pairs of partially overlapping resilient sector-shaped carriers for two annular friction linings. The carriers are disposed axially between the friction linings and each such carrier has a flat portion as well as a set of substantially radially extending tongues which are partly cut out and project from the flat portion. The friction linings are fastened to the carriers by stepped rivets, and such rivets further serve to fix the carriers of each pair to each other in axially stressed condition.

43 Claims, 10 Drawing Sheets

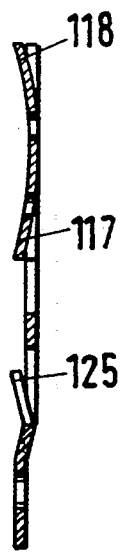
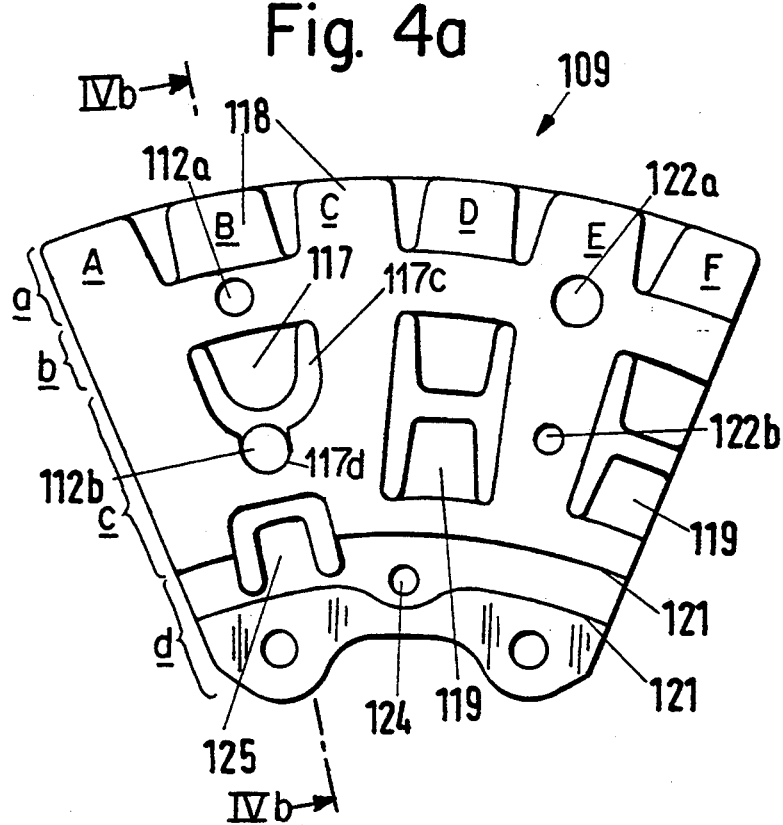
Fig. 4b
Fig. 4a

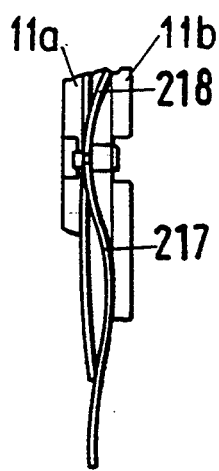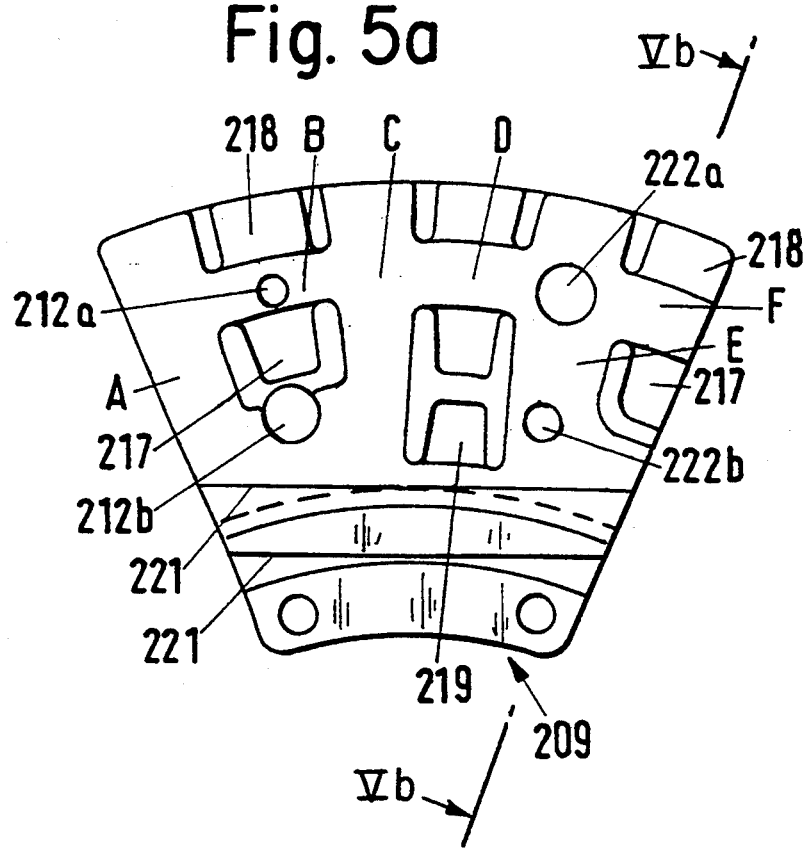

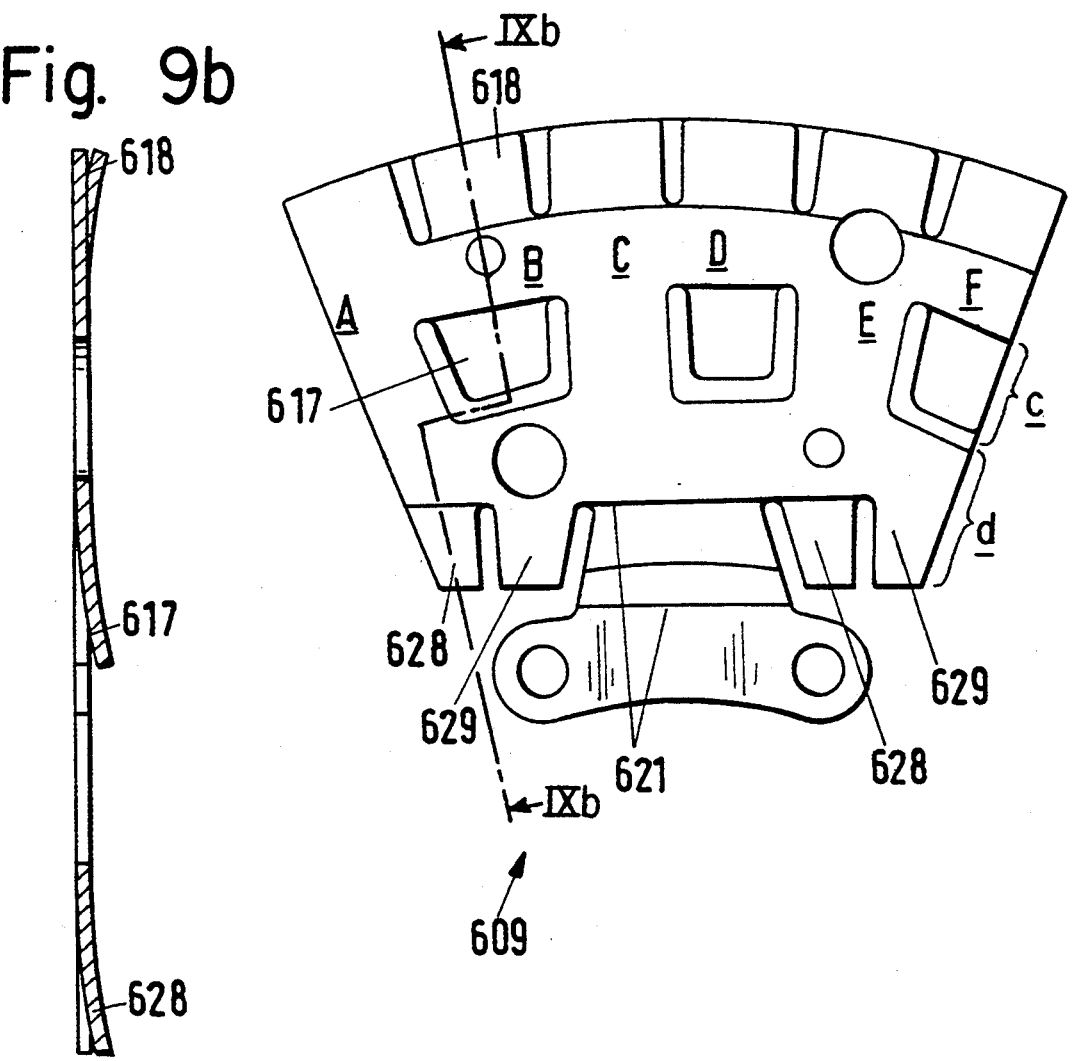

5,413,202

FRICTION GENERATING TORQUE TRANSMITTING DEVICE

BACKGROUND OF THE INVENTION

The invention relates to improvements in friction generating devices which are used to transmit torque. Typical examples of such devices are clutch plates (also called clutch discs) which are used in friction clutches to transmit torque from a rotary driving part (such as a flywheel which receives torque from the output element of a combustion engine) to a rotary driven part (such as the input element of a variable-speed transmission in a motor vehicle). For the sake of simplicity, the improved device will hereinafter be referred to as a clutch plate with the understanding, however, that its features can be embodied in other types of friction-generating torque-transmitting devices or units.

Clutch plates to which the present invention pertains normally comprise a rotary hub (which can transmit torque to the input shaft of a transmission), a disc which is coaxial with and surrounds and is affixed to or is made of one piece with the hub, two annular friction linings one of which can be frictionally engaged by a flywheel and the other of which can be frictionally engaged by a pressure plate when the friction clutch employing the clutch plate is in actual use, and carriers which are connected to and drive the disc (and hence the hub) and are further connected to the friction linings to receive torque from the flywheel when the clutch is engaged to rotate the input shaft of the transmission in response to rotation of the flywheel. The inner diameters of the annular friction linings normally exceed the outer diameter of the disc, and the carriers normally form an annulus of pairs of confronting carriers which are affixed to the friction linings as well as to the disc and axially yieldably bear against each other.

A clutch plate of the above outlined character is disclosed, for example, in German Auslegeschrift No. 1 233 669. Each friction lining contacts two circumferentially spaced apart portions of one of each pair of carriers, i.e., a substantial portion of each friction lining remains unsupported between the two spaced apart portions of a total of one-half of the overall number of carriers. When the friction clutch employing the just described clutch plate is engaged so that the two linings are in frictional engagement with the adjacent torque transmitting and torque receiving elements of the clutch, the transmission of torque takes place only at the relatively few locations where the friction linings are in actual contact with the adjacent carriers. The non-engaged portions are free to undergo a certain amount of elastic deformation and are subject to much less pronounced wear than the actually engaged portions.

A drawback of non-uniform wear upon the friction linings is that the temperature- and/or pressure-induced deformation of friction linings is a function of the extent of wear. As a rule, the friction linings recede toward each other between the spaced-apart locations of positive contact with the adjacent carriers. This results in premature pronounced contact between large portions of the two friction linings in response to engagement of the friction clutch before the carriers have undergone full resilient deformation. As the penetration of the friction linings into the spaces between the portions of actual contact with the adjacent carriers progresses, the percentage of resilient deformability of the pairs of carriers decreases, i.e., a progressively increasing percentage of the resilient deformability of the carriers in wasted.

OBJECTS OF THE INVENTION

An object of the invention is to provide a clutch plate wherein the wear upon the friction linings is more uniform than in heretofore known clutch plates.

Another object of the invention is to provide a clutch plate wherein the friction linings are prevented from receding between spaced apart portions of the adjacent resilient carriers.

A further object of the invention is to provide novel and improved carriers for use in the above outlined clutch plate.

An additional object of the invention is to provide a clutch plate wherein the area of contact between the friction linings and their carriers is much greater than in conventional clutch plates.

Still another object of the invention is to provide a clutch plate wherein the friction linings are affixed to their carriers in a novel and improved way.

A further object of the invention is to provide a friction clutch which embodies the above outlined clutch plate.

Another object of the invention is to provide novel and improved means for balancing the above outlined clutch plate.

An additional object of the invention is to provide a power train for use in motor vehicles wherein the transmission of torque from a rotary driving part to a rotary driven part is effected by resorting to a clutch plate of the above outlined character.

Still another object of the invention is to provide a novel and improved mode of connecting carriers of friction linings to each other in a manner and for the purpose to ensure uniform or more uniform wear upon the friction linings.

A further object of the invention is to provide a clutch plate which can be utilized as a superior and longer-lasting substitute for heretofore known and used clutch plates, particularly in the power trains of motor vehicles.

Another object of the invention is to provide a clutch plate wherein the resiliency of the carriers for friction linings is put to better use than in conventional clutch plates.

An additional object of the invention is to provide a clutch plate wherein the useful life of the friction linings is a multiple of the useful life of friction linings in conventional clutch plates.

SUMMARY OF THE INVENTION

The invention is embodied in a friction-operated torque transmitting device, such as a clutch plate, which comprises a rotary hub, a disc which is coaxial with and is affixed to the hub, two annular friction linings which are coaxial with the hub and have inner diameters greater than the outer diameter of the disc, and an annulus of pairs of confronting substantially sector-shaped resilient carriers which are disposed axially between the friction linings and are secured to the disc. The carriers have substantially flat portions as well a substantially radially extending tongues which are partly cut out and project from the flat portions, and the improved device further comprises means for fastening the carriers to the friction linings. Such fastening means includes means for fixing the carriers of the pairs of confronting carriers to each other in axially stressed condition. Each carrier preferably comprises a plurality of tongues, and at least one tongue of at least one carrier of each pair of carriers is located opposite a flat portion of the other carrier of the respective pair.

In accordance with a presently preferred embodiment, the fastening means comprises a plurality of rivets for each pair of carriers, and each rivet is provided with external shoulders which engage the carriers.

Each of the fixing means can be arranged to connect the flat portion of one carrier to the flat portion of the other carrier of the respective pair of carriers.

Each carrier can comprise a radially extending part which is overlapped by the friction linings, and the ratio of the flat portion to the overlapped part of each carrier can be at least 40 percent. It is presently preferred to select a ratio of between 40 and 70 percent.

The flat portion of each carrier can be larger than the sum of the tongues of the respective carrier.

Each carrier can include an even number of radially extending sections having at least substantially identical sizes, and the sections of each carrier can include sections which form part of the respective flat portion and alternate with sections which are provided with tongues.

Each carrier can comprise a plurality of arcuate sections which extend circumferentially of the hub and include at least one section forming part of the respective flat portion as well as at least one section having at least one tongue. The arcuate sections of each carrier include a radially outermost section which is provided with at least one tongue. An inner arcuate section of each carrier is preferably devoid of tongues and is preferably immediately radially inwardly adjacent the respective radially outermost arcuate section. The arcuate sections can be further described as follows: The arcuate sections of each carrier include a first section forming part of the respective flat portion and being devoid of tongues, and a second section which is disposed radially inwardly of the first section and has at least one pair of tongues; one of these tongues is aligned with and is disposed radially outwardly of the other tongue. The tongues of each such pair have free ends which are adjacent each other.

At least one carrier of each pair of carriers includes at least one tongue which is flexed toward a tongue of the other carrier of the respective pair. The arrangement can be such that at least one carrier of each pair of carriers includes at least one tongue which is flexed toward and contacts a tongue of the other carrier of the respective pair of carriers. Still further, the arrangement can be such that at least one carrier of each pair of carriers includes at least one tongue which is bent toward and contacts an unflexed tongue of the other carrier of the respective pair.

The tongues of each carrier can include radially inner tongues and radially outer tongues, and each such carrier can further comprise a section which is disposed radially inwardly of the respective radially inner tongues and forms part of the respective flat portion. Each such section can form an arc of a circle.

In accordance with a presently preferred embodiment, each carrier comprises a radially outer arcuate section which extends circumferentially of the hub, a radially inner arcuate section which also extends circumferentially of the hub, and radially extending sections which connect the inner and outer arcuate sections. The sections form part of the flat portion of the respective carrier.

Each carrier can comprise an even number of radially extending sections including sections forming part of the respective flat portion and alternating with sections having tongues.

The carriers of each pair of carriers can be identical and can be affixed to each other back-to-back.

The tongues can extend at least substantially along the line of a flexure of a flexible beam, as seen in the radial direction of the hub.

The aforediscussed tongues can be deformed axially along arcs of a circle as seen in the radial direction of the hub.

The height of the tongues can exceed the extent of axial movability of the respective carriers.

The carriers can be provided with openings for balancing elements and such openings are preferably disposed radially inwardly of the friction linings and radially outwardly of the disc. The balancing elements can include rivets. The arrangement can be such that each balancing element is non-movably affixed to one of a pair of carriers. The one carrier of each pair can be provided with a relatively small first opening and the other carrier of each pair can be provided with a relatively large second opening in register with the respective first opening. Each balancing element then preferably comprises a rivet having a first head which is adjacent the first opening and a second head adjacent the second opening of the respective registering first and second openings.

Each carrier can include a radially innermost part which is secured to the disc and radially outwardly extending parts which are disposed radially outwardly of the radially innermost part. The radially outwardly extending parts include radially outermost portions forming part of flat portions of the respective carriers and extending along a circular arc. Each carrier can include two radially outwardly extending parts. The radially outwardly extending parts of each carrier can be designed to bound a cutout, and one tongue of the respective carrier is partially surrounded by such cutout. Each radially outwardly extending part of each carrier is adjacent one end of a carrier part which is secured to the disc. At least one radially outwardly extending part of each carrier can be offset in the circumferential direction of the hub with reference to an opening which is provided in the respective carrier for a rivet serving to secure the carrier to the disc. Each radially outwardly extending part of each carrier can be offset relative to the corresponding opening. The radially extending parts of each carrier can be offset in the same direction with reference to the corresponding opening.

The fastening means can comprise a plurality of rivets for each pair of carriers, and each rivet can be provided with means for connecting one carrier of the respective pair to one of the friction linings.

Each carrier is movable axially of the hub through a predetermined distance, and each carrier can include a radially inner section which is deformed (e.g., undulated) axially of the hub through approximately one-half of such distance.

The radially inner section of each carrier can include a radially inner portion which is affixed to the disc and a radially outer portion having at least one opening disposed radially inwardly of the friction linings and serving to promote the flexibility of the respective part of the carrier. Such opening can be elongated in the circumferential direction of the disc and hub.

In accordance with a presently preferred embodiment of the invention, the fastening means comprises two pairs of rivets for each pair of carriers. The rivets of one pair are mirror images of rivets of the other pair with reference to a plane which includes the axis of the hub and is disposed midway between the two pairs of rivets. The rivets of each pair include a radially outer rivet and a radially inner rivet, and each carrier can have a plurality of radially extending sections including first sections with flexed tongues and second sections. Each rivet connects a first section of one carrier with a second section of the other carrier of the respective pair of carriers. Each such rivet can be provided with a stepped shank, and the radially outer rivet of each pair of rivets is or can be inverted through 180° with reference to the radially inner rivet of the respective pair of rivets.

The novel features which are considered as characteristic of the invention are set forth in particular in the appended claims. The improved torque transmitting device itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 4a is an elevational view of a modified carrier which can be utilized in the improved clutch plate;

FIG. 4b is a sectional view as seen in the direction of arrow from the line IVb—IVb in FIG. 4a;

FIG. 5a is an elevational view of a third carrier which can be utilized in the improved clutch plate;

FIG. 5b is an fragmentary sectional view substantially as seen in the direction of arrows from the line Vb—Vb in FIG. 5a;

FIG. 7b is a sectional view substantially as seen in the direction of arrows from the line VIIb—VIIb in FIG. 7a;

FIG. 7c fragmentary sectional view substantially as seen in the direction of arrows from the line VIIc—VIIc in FIG. 7a;

FIG. 7d is a sectional view substantially as seen in the direction of arrows from the line VIId—VIId in FIG. 7a;

FIG. 8b is an enlarged sectional view substantially as seen in the direction of arrows from the line VIIIb—VIIIb in FIG. 8a;

FIG. 8c is a fragmentary sectional view as seen in the direction of arrows from the line VIIIc—VIIIc in FIG. 8a;

FIG. 9a is an elevational view of a seventh carrier which can utilized in the improved clutch plate;

FIG. 9b is an enlarged sectional view substantially as seen in the direction of arrows from the line IXb—IXb in FIG. 9a.

DESCRIPTION OF PREFERRED EMBODIMENTS

Figure 1:
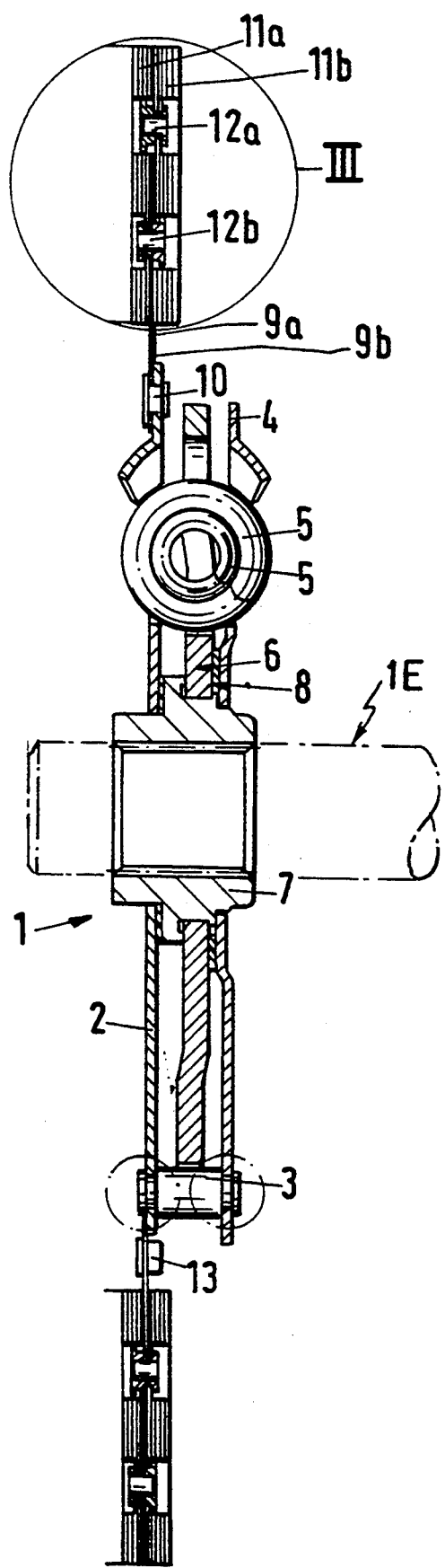
FIG. 1 is a sectional view of a torque transmitting device in the form of a clutch plate which embodies one form of the invention, the section being taken in the direction of arrows as seen from the line I—I in FIG. 2.
Figure 2:
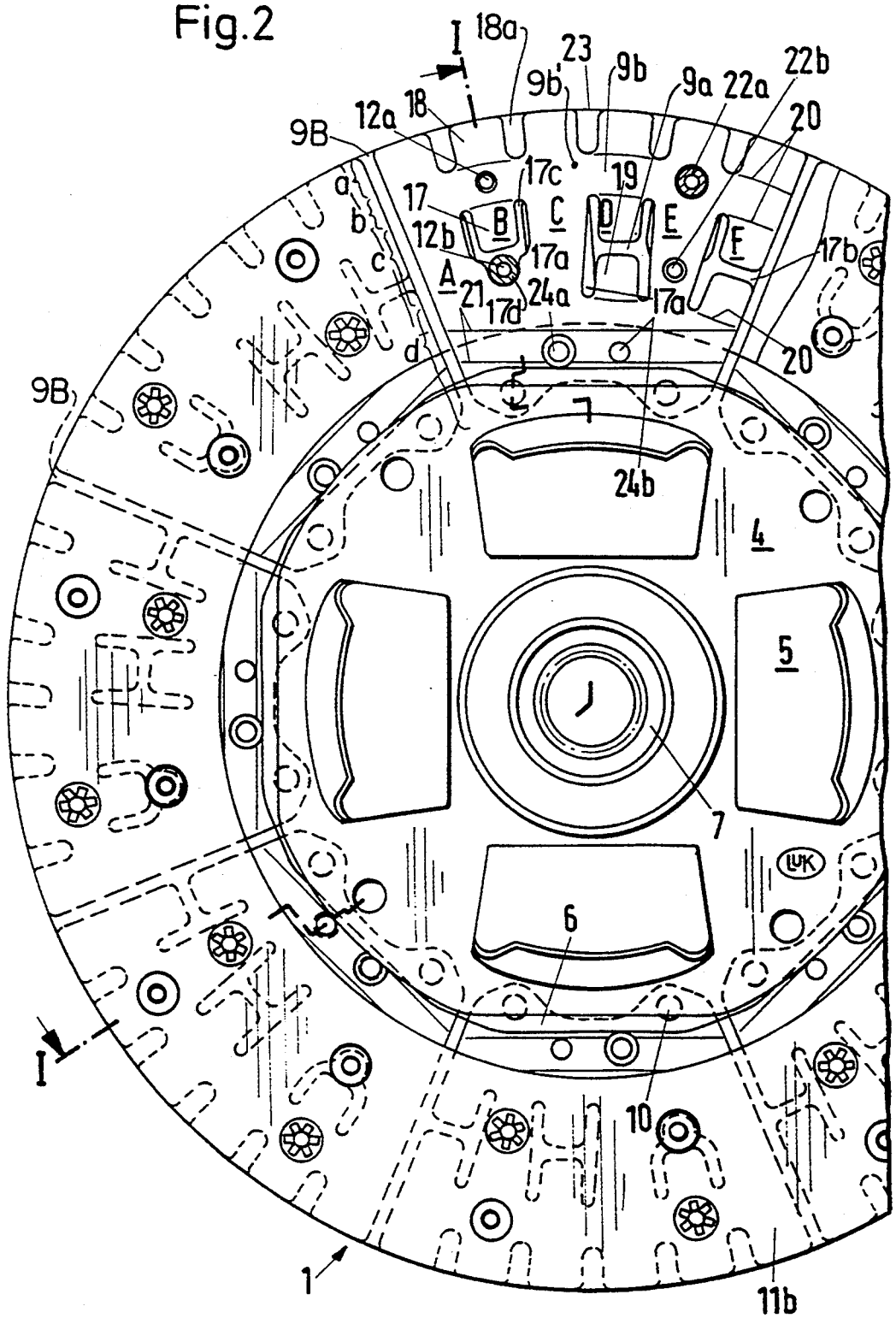
FIG. 2 a fragmentary elevational view of the clutch plate as seen from the right-hand side of FIG. 1, with a portion of one of the friction linings broken away.
Figure 3:
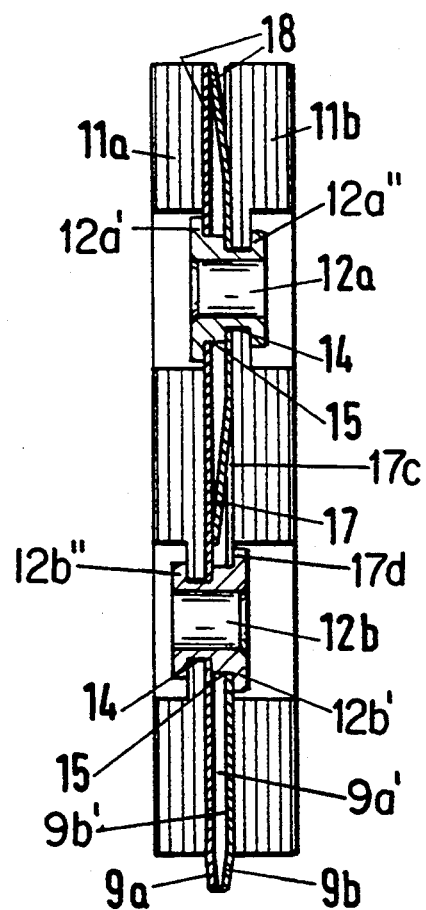
FIG. 3 is an enlarged view of a detail within the circle III in FIG. 1.

Referring first to FIGS. 1 to 3, there is shown a torque transmitting device which constitutes a clutch plate 1 including a disc 2 which is coaxial with and is connected to a second disc or cover disc 4 by axially parallel distancing elements 3. Such distancing elements can constitute or include rivets. A damper including energy storing elements in the form of coil springs 5 is provided to couple the discs 2 and 4 to a radially outwardly extending flange 6 of a hub 7. The latter non-rotatably surrounds the input element IE of a variable-speed transmission when the clutch including the clutch plate 1 is installed in the power train of a motor vehicle to transmit torque from the output element (e.g., a crtankshaft) of a combustion engine to the input element IE. The flange 6 is of one piece with or is rigidly secured to the hub 7. The damper including the energy storing elements 5 yieldably opposes angular movements of the hub 7 and flange 6 relative to the discs 2, 4 and/or vice versa. Such damper further includes a friction generating device 8 which is disposed radially inwardly of the energy storing elements 5 and can yieldably oppose some or all of the angular movements of the hub 7 and flange 6 relative to the discs 2, 4 and/or vice versa.

The disc 2 is surrounded by an annular array of pairs of confronting substantially sector-shaped resilient carriers 9a, 9b which are disposed axially between two annular friction linings 11a, 11b and are secured to the disc 2 by rivets 10. The inner diameters of the friction linings 11a, 11b are larger than the outer diameter of the disc 2. The means for fastening the carriers 9a, 9b to the friction linings 11a, 11b also serves as a means for fixing the carriers 9a, 9b of pairs of confronting carriers to each other. In the illustrated embodiment, the combined fastening and fixing means includes two pairs of specially configured and mounted rivets 12a, 12b and 22a, 22b. These rivets not only serve to transmit torque but also maintain certain components of the improved clutch plate 1 at a selected optimum axial distance from each other.

The clutch plate 1 of FIGS. 1 to 3 further comprises one or more balancing elements 13 in the form of rivets. The arrangement is preferably such that each balancing rivet 13 is affixed to only one of the respective pair of confronting carriers 9a, 9b and extends with clearance into or through a hole of the other carrier. Thus, the diameter of the hole in the other carrier is larger than the diameter of the first or second head of the respective balancing rivet 13. Such mounting of the balancing rivet or rivets 13 is desirable and advantageous because the carriers 9a, 9b of each pair can move relative to each other in the axial direction of the clutch plate 1, and such movements are neither opposed nor otherwise influenced by the balancing rivet or rivets 13.

The manner in which the friction linings 11a, 11b are fastened to a pair of confronting carriers 9a, 9b is shown in FIG. 3. The fastening means includes the rivets 12a, 12b which are spaced apart from one another in the radial direction of the clutch plate 1. The rivet 12a is identical with the rivet 12b; however, these rivets are mounted in positions turned relative to each other through 180° so that the first head 12a' of the rivet 12a and the second head 12b" of the rivet 12b are disposed at the exposed side of the friction lining 11a whereas the second head 12a" of the rivet 12a and the first head 12b' of the rivet 12b are disposed at the exposed side of the friction lining 11b. Each of the rivets 12a, 12b has three external shoulders one of which is defined by the first head 12a', 12b', another of which is defined by the second head 12a", 12b", and the third of which is disposed between the first and second shoulders and confronts the respective second shoulder. This is achieved by providing each of the rivets 12a, 12b with a shank having a larger-diameter portion 15 between the first and third shoulders and a smaller-diameter portion 14 between the second and third shoulders. As can be seen in FIG. 3, the larger-diameter portion 15 of the radially outer rivet 12a extends through a hole of the carrier 9a which abuts the first shoulder, i.e., the first head 12a'. The smaller-diameter portion 14 of the shank of the rivet 12a extends through a hole of the friction lining 11b which abuts the second shoulder, i.e., the second head 12a"; such smaller-diameter portion 14 also extends through a registering hole of the carrier 9b which abuts the third shoulder of the rivet 12a. The hole in the friction lining 11a for the head 12a' of the rivet 12a is so large that this friction lining does not contact the rivet 12a.

The mounting of the rivet 12b is exactly opposite to that of the rivet 12a, i.e., the rivet 12b does not contact the friction lining 11b but its second shoulder (i.e., its second head 12b") abuts the lining 11a.

The just described manner of mounting the rivets 12a, 12b ensures that the rivet 12a permits axial movements of adjacent portions of the friction lining 11a and section 9a relative to the adjacent portions of the friction lining 11b and carrier 9b, and that the rivet 12b permits axial movements of the adjacent portions of friction lining 11b and carrier 9b relative to the adjacent portions of the friction lining 11a and carrier 9a.

FIGS. 2 and 3 show that the carriers 9a and 9b include relatively large flat or nearly flat portions 9a', 9b' and substantially radially extending tongues 17, 18, 19 which are partly cut out from the respective flat portions and at least some of which project (i.e., are flexed) from the planes of the respective flat portions toward the other carrier. Thus, at least some tongues of the carrier 9a project toward the carrier 9b and vice versa. The arrangement is such that the tongues 17 to 19 cooperate with the rivets 12a, 12b and 22a, 22b to ensure that the carriers 9a, 9b of each pair of carriers are fixed to each other in axially stressed condition.

As can be best seen in FIG. 2, each of the tongues 17, 18, 19 includes a root portion or base portion 20 which is of one piece with the flat portion 9a' or 9b' of the respective resilient carrier. All such tongues of the carrier 9a which are flexed from the flat portion 9a' of this carrier extend toward the carrier 9b, and all such tongues of the carrier 9b which are flexed from the respective flat portion 9b' extend toward the carrier 9a.

A portion of the front friction lining 11b is broken away in FIG. 2 in order to reveal an entire sector-shaped resilient carrier 9b which overlies a major part of the corresponding carrier 9a. The carrier 9b includes six radially extending portions or sections A, B, C, D, E and F which have or which can have identical widths (as seen in the circumferential direction of the friction linings 11a, 11b and hub 7). The sections or portions A–F are partially separated from each other by radial cutouts or notches 18a which are provided in the peripheral surface of the carrier 9b and separate the neighboring tongues 18 (one on each of the sections A–B) from one another. The section A is part of the respective flat portion 9b' because its tongue 18 is not flexed toward the associated carrier 9a. The section B has two tongues 18, 17 which are flexed toward the associated carrier 9a; the remaining portion of the section B forms part of the flat portion 9b'. The sections C and E are identical with the section A, i.e., each of the sections C and E forms part of the flat portion 9b'. The section D has three flexed tongues 17, 18, 19; the free portions or tips of the tongues 17, 19 face each other across the central portion or web of a substantially H-shaped cutout 17a in the carrier section D. The section F is similar to the section D; the difference is that the tongues 17, 19 of the section F are separated from each other by a circumferentially extending portion of a substantially T-shaped cutout 17b in the carrier 9b. Three sides of the tongue 17 in the section B are surrounded by a substantially C-shaped or U-shaped cutout 17c of the carrier 9b.

It will be noted that the carrier 9b includes an even number (six) of radially extending portions or sections A to F.

FIG. 2 further shows that the carrier 9b can be said to comprise a total of four circumferentially extending arcuate portions or sections a, b, c and d. The section a is the outer or outermost section of the carrier 9b, the section a is the inner or innermost section, and the sections b and c constitute two median or intermediate sections. The section a includes six tongues 18 including three flexed tongues 18 (these form part of the radially extending sections B, D and E) and three unflexed tongues forming part of the flat portion 9b'. The entire arcuate section b forms part of the flat portion 9b' of the carrier 9b, and this arcuate section is provided with two holes for portions of the two radially outer rivets 12a, 22a. The section c is wider (as considered radially of the clutch plate 1) than the sections a, b and c because it comprises (three) flexed tongues 17 as well as (two) flexed tongues 19. Furthermore, the section c has holes for the two radially inner rivets 12b, 22b. The major portion of the radially inner or innermost arcuate section d forms part of the flat portion 9b' of the carrier 9b. The remaining portion 21 of the section d is undulate and extends or can extend substantially tangentially of the adjacent portion of the disc 2 (not visible in FIG. 2).

The radially extending portion or section A is identical with the portion or section C and differs from the section E only in that the latter has holes for portions of the respective rivets 22a, 22b. Such holes are disposed radially outwardly of each other, i.e., the hole for the rivet 22a is provided in the arcuate section b and the hole for the rivet 22b is provided in the arcuate section c. The radially extending section or portion B is identical with the sections D and F in the region of the outer arcuate section a, i.e., the tongues 18 of the sections B, D, E are flexed in the same direction out of the flat portion 9b' and toward the adjacent carrier 9a. The section B differs from the sections D and F because it does not have a flexed tongue 19. Furthermore, the section B has holes for a pair of rivets 12a, 12b, and such holes are not provided in the section D and/or F. Still further, the section B is provided with the aforementioned C-shaped or U-shaped cutout 17c whereas the section D is provided with the aforementioned H-shaped cutout 17a and the section F is provided with the aforementioned T-shaped cutout 17b. The cutouts 18a, 17a, 17b, 17c are or can be formed in a stamping or like machine at the time of making the carrier 9b.

The resiliency of tongues 17 and/or 19 (and hence of the entire carrier 9b) can be influenced by changing the dimensions and/or the shape of the cutouts 17a, 17b and/or 17c.

As can be seen in the upper right-hand portion of FIG. 2, the T-shaped cutout 17b differs from the H-shaped cutout 17a because the radially extending section F is adjacent the narrow radial clearance between two neighboring carriers 9b; thus, such clearance can be said to form part of the cutout 17b or vice versa. The right-hand marginal portion of the fully visible carrier 9b of FIG. 2 is interrupted only in the region where the clearance between the two neighboring carriers 9b communicates with the T-shaped cutout 17b.

The U-shaped cutout 17c which surrounds the tongue 17 of the radially extending section B includes a radially inward extension 17d for the rivet 12b. The extension 17d is sufficiently large to ensure that the rivet 12b cannot contact the carrier 9b.

The first heads (12a', 12b') of the rivets 12a, 12b shown in FIG. 3 are those heads which are formed prior to making of the respective second heads 12a", 12b". The second heads 12a", 12b" are formed by suitable deforming tools and serve to connect the respective rivets to one each of the friction linings 11a, 11b. Thus, the second head 12a" connects the rivet 12a of FIG. 3 to the friction lining 11b because such friction lining is confined (together with the adjacent portion of the carrier 9b) between the head 12a" and the third shoulder of the rivet 12a. The second head 12b" connects the rivet 12b of FIG. 3 to the friction lining 11a because the friction lining 11a is confined (together with the adjacent portion of the carrier 9a) between the second head 12b" and the third shoulder of the rivet 12b of FIG. 3.

FIG. 2 shows that the two pairs of rivets 12a, 12b and 22a, 22b (which fasten the fully shown carrier 9b to the confronting carrier 9a) are mirror images of each other with reference to a plane 23 which halves the carrier 9b and includes the axis of the clutch plate 1. The distance of the rivet 12a from the plane 23 is the same as that of the rivet 22a, and the distance of the rivet 12b from the plane 23 is the same as that of the rivet 22b. The rivet 12a of FIG. 2 is turned through 180° relative to the rivet 22a, and the rivet 12b of FIG. 2 is turned through 180° relative to the rivet 22b.

The carriers 9a in the clutch plate 1 of FIGS. 1 to 3 are identical with the carriers 9b, and the carriers 9a, 9b of each pair are fixed to each other back-to-back by four rivets 12a, 12b, 22a, 22b. Such back-to-back mounting of the carriers 9a, 9b of each pair ensures that the tongues 17, 19 and flexed tongues 18 of the carrier 9a extend toward the carrier 9b and that the tongues 17, 19 and the flexed tongues 18 of the carrier 9b extend toward the carrier 9a. The back-to-back positioning of carriers 9a, 9b of each pair ensures that the sections A, B, C, D, E, F of the carrier 9b are respectively adjacent the sections F, E, D, C, B, A of the corresponding carrier 9a. It can be said that the carrier 9b of each pair corresponds to the respective carrier 9a subsequent to turning about an axis in the respective symmetry plane 23 through an angle of 180°.

The section F of the carrier 9a is adjacent the section A of the corresponding carrier 9b (the latter practically completely overlies the carrier 9a) so that the tongues 18, 17, 19 of the section F of the carrier 9a abut the adjacent (rear or inner) side of the flat portion 9b' (and more particularly the completely or nearly completely flat section A) of the carrier 9b. The extent to which the tongues 17, 19 and some of the tongues 18 are flexed out of the flat portions 9a', 9b') of the respective carriers 9a and 9b at least matches the contemplated extent of resilient deformation of the carriers in the axial direction of the clutch plate 1.

The section B of the fully illustrated carrier 9b of FIG. 2 is located in front of the section E of the associated carrier 9a. The section E of the carrier 9a is flat or practically flat and is contacted by the flexed tongues 18 and 17 of the section B forming part of the carrier 9b. The openings or holes which are provided in the section E of the carrier 9a are in register with openings or holes in the section B of the carrier 9b to provide room for the respective rivets 12a and 12b. The tips or free end portions of tongues 18 and 17 on the section B of the carrier 9b abut the flat portion 9a' (and more specifically the section E) of the carrier 9a behind the carrier 9b. The extension 17d of the cutout 17c in the section B of the carrier 9b is provided in the region which would normally form part of a tongue 19; such tongue is omitted because the corresponding part of the section B of the carrier 9b is provided with the extension 17d for the inner rivet 12b which secures the section B of the carrier 9b to the section E of the carrier 9a and cooperates with the rivet 12a to ensure that the flexed tongues of the carrier 9b bear against the flat portion 9a' of the carrier 9a as well as that the flexed tongues of the carrier 9a bear against the flat portion 9b' of the carrier 9b. As already described in connection with FIG. 3, the first head 12b' of the rivet 12b does not contact the friction lining 11b because dimensions of the extension 17d are selected with a view to ensure that the carriers 9a, 9b (as well as the friction linings 11a, 11b) can move relative to each other axially of the clutch plate 1 in the region of the rivet 12b. The situation is the same in the region of the rivet 12a except that the rivet 12a cannot move relative to the adjacent portions of the friction lining 11b and carrier 9b but is movable axially relative to the adjacent portions of the carrier 9a and friction lining 11a.

The section C of the fully illustrated carrier 9b of FIG. 2 is located in front of the section D of the corresponding carrier 9a. Thus, the rear or inner side of the flat portion 9b' of the carrier 9b is engaged by the flexed tongues 18, 17, 19 of section D forming part of the carrier 9a. It will be seen that a very large part of the section C forming part of the carrier 9b is propped from behind, namely by the three tongues 18, 17, 19 of section D forming part of the corresponding carrier 9a. Thus, the propping of the section C of the carrier 9b is just as extensive or pronounced as the propping of section A because the latter is contacted by the three tongues 18, 17, 19 of section F forming part of the carrier 9a. In other words, two of the six sections of the carrier 9b are propped from behind by three tongues each, and one section (E) of the carrier 9b is proposed from behind by two tongues (namely by the tongues 18, 17 of section B forming part of the carrier 9a).

At least the tips of tongues 18, 17, 19 of the section D forming part of the carrier 9b in the upper portion of FIG. 2 abut the flat portion 9a' (and more particularly the section C) of the adjacent carrier 9a. The flat rear or inner side of the section E forming part of the carrier 9b is engaged by tips (or by larger portions) of tongues 18, 17 forming part of section B of the carrier 9a. The holes for the rivets 22a, 22b in the section E of the carrier 9b register with the holes which are provided for such rivets in the section B of the carrier 9a. The arrangement is the same as described with reference to the rivets 12a, 12b, i.e., one of the rivets 22a, 22b shares the axial movements of adjacent portions of the friction lining 11a and carrier 9a and the other of these rivets shares the axial movements of adjacent portions of the friction lining 11b and carrier 9b.

At least the tips of flexed tongues 18, 17, 19 forming part of the section F of the carrier 9b abut the flat portion 9a' (and more particularly the section A) of the carrier 9a. The continuity of the right-hand marginal portion of the carrier 9b in the upper portion of FIG. 2 is interrupted only by the central portion of the T-shaped cutout 17b.

As already mentioned hereinbefore, the radially innermost arcuate section d of each carrier 9a, 9b has an undulation 21 which extends in the axial direction of the clutch plate 1 through a distance corresponding to or approximating one-half the extent of axial movability of the friction linings. This ensures that friction linings can perform an axial movement through the entire contemplated distance when the carriers 9a, 9b of each pair are mounted back-to-back. The undulations 21 are provided in the region of openings or holes 24a, 24b for the balancing rivets 13. The distance of the openings 24a, 24b from the symmetry plane 23 of the carrier 9b shown in the upper portion of FIG. 2 is the same, and one of these openings is larger than the other opening. The opening 24b snugly receives the shank of a balancing rivet 13 but one head of such rivet is received with clearance in the opening 24a of the adjacent carrier 9a. When the carriers 9a, 9b of a pair are positioned back-to-back, the clutch plate 1 can be balanced from the one or the other side in such a way that the balancing rivet 13 which has been applied to one of the carriers 9a, 9b does not interfere with axial movements of the adjacent portion of the other carrier.

The clutch plate 1 of FIGS. 1 to 3 comprises eight pairs of discrete carriers 9a, 9b. However, it is equally within the purview of the invention to establish connections between the radially inner or innermost portions of neighboring carriers 9a and/or between the radially inner or innermost portions of neighboring carriers 9b. This would result in the provision of two circumferentially complete carriers one of which would include eight interconnected carriers 9a and the other of which would comprise eight interconnected carriers 9b. The carriers of each composite carrier would be partially separated from each other by radially extending clearances or slots constituting shortened versions of gaps 9B shown in FIG. 2. At least partial separation of neighboring sections 9a and/or 9b from each other is desirable and advantageous on the ground that thermal stressing of a discrete carrier 9a or 9b to an extent departing from thermal stressing of the neighboring discrete carrier or carriers 9a or 9b does not result in tensioning which could develop if neighboring carriers 9a or 9b were integrally joined to each other.

One the other hand, the provision of only two composite circumferentially complete carriers, each of which includes a selected number (e.g., eight) of carriers 9a or 9b, simplifies the making as well as the installation of such carriers. It is important to ensure that the flexed tongues of one carrier abut the flat portion of the confronting carrier and vice versa irrespective of whether the carriers 9a or 9b are completely separated from each other or together form a complete one-piece annulus of coherent carriers 9a or 9b.

It is further possible to have at least some flexed tongues of a carrier 9b abut flexed tongues of the adjacent confronting carrier 9a. For example, if all six tongues 18 of the carrier 9b which is shown in the upper portion of FIG. 2 are flexed toward the confronting carrier 9a and all six tongues 18a of the carrier 9a are flexed toward the carrier 9b, each tongue 18 of the carrier 9b bears against a tongue 18 of the carrier 9a. In such clutch plates, the flexing of the tongues 18 is such that it corresponds to half the extent of axial movability of the friction linings 11a, 11b toward and away from each other.

FIGS. 2 and 3 show that each of the two pairs of rivets 12a, 12b and 22a, 22b for each pair of carriers 9a, 9b connects a part of the flat portion 9a' of the carrier 9a to a part of the flat portion 9b' of the carrier 9b.

In accordance with a presently preferred embodiment, each carrier 9a, 9b includes a part which is overlapped by the friction linings 11a, 11b, and the ratio of the flat portion 9a' or 9b' to the overlapped part of each carrier 9a or 9b is at least 40 percent of the overlapped part. Such ratio can be between 40 and 70 percent. Otherwise stated, the entire flat portion 9a' or 9b' of a carrier 9a or 9b has an area not less than 40 percent of the area of that part which is overlapped by the friction linings 11a and 11b. Furthermore, the flat portion 9a' or 9b' of each carrier 9a or 9b is preferably greater than the remaining portion (including the flexed tongues 18, 17 and 19) of the respective carrier. This ensures that only minor portions of the friction linings 11a and 11b are not directly supported by the adjacent carriers 9a and 9b, i.e., only those portions of the carriers which include the flexed tongues do not contact the adjacent friction linings.

It is presently preferred to construct each carrier in such a way that it comprises an even number of radially extending sections or portions (A to F). Furthermore, the width of each of these sections (as measured in the circumferential direction of the disc 2) is preferably the same. By providing each carrier with an even number of radially extending sections, one ensures that each section (such as B, D or F) which is provided with one or more flexed tongues precedes or follows a section (such as A, C or E) which is at least substantially flat, i.e., which forms part of the respective flat portion 9a' or 9b'.

The carriers 9a and 9b can be simplified by reducing the number of arcuate sections or portions. For example, the carrier 9b which is shown in the upper portion of FIG. 2 can comprise the arcuate sections a and b or b and c or c and d, i.e., an arcuate section without flexed tongues and an arcuate segment with flexed tongues. It is normally preferred to employ carriers wherein the radially outer or outermost arcuate section is provided with tongues (such as 18) at least one of which is flexed or bent toward the adjacent section of the confronting carrier. As already mentioned above, the flexed tongues of one of each pair of carriers can abut the flat portion of the other carrier, or at least some flexed tongues of one of the carriers can bear against the tongues of the other carrier.

The section c of the carrier 9b in the upper portion of FIG. 2 has two pairs of flexed tongues 17, 19 with free end portions or tips which are adjacent each other. In other words, the base or root portions 20 of such pairs of tongues 17, 19 are adjacent the arcuate sections b and d, respectively. The radially innermost arcuate section d of each carrier 9a or 9b can but need not form an arc of a circle.

The flat median portions of the radially extending sections A, C and E can be said to constitute spokes which connect the radially outermost arcuate section a with the radially innermost arcuate or substantially arcuate section d of the carrier 9b in the upper portion of FIG. 2. Such median portions of the radially extending sections A, C and E and the arcuate sections a and d can be said to constitute a frame which is part of the flat portion 9b' of the carrier 9b (with the exception of the three flexed tongues 18 in the section a and the undulation or deformation 21 in the section d). The rivets 12a, 12b and 22a, 22b are distributed in such a way that two of these rivets connect a radially extending flat spoke of the carrier 9b to a radially extending section forming part of the carrier 9a and having flexed tongues, and that the other two rivets connect a radially extending flat spoke of the carrier 9a to a radially extending section forming part of the carrier 9b and having flexed tongues.

It is often of advantage for the spring characteristic of the improved clutch plate that the tongues extend at least substantially along the line of curvature of a flexible beam, as seen in the radial direction. This renders it possible to achieve a linear spring characteristic. On the other hand, it is often advisable to deform the tongues axially along the arc of a circle as seen in the radial direction. This results in the establishment of a progressive characteristic curve. Still further, it is possible to select a hybrid characteristic curve which is a combination of the aforediscussed curves. Other types of characteristic curves can be selected with equal facility.

The extent of flexing or bending of the tongues can exceed the extent of axial movability or deformability of the carriers. This ensures that the flexed tongues of one carrier bear against the other carrier when such carriers are riveted to one another back-to-back.

It is presently preferred to rivet the carriers 9a to the friction lining 11a and the carriers 9b to the friction lining 11b in such a way that the second head (such as 12a" or 12b") of each rivet is formed in a radially extending section in a part (namely a portion of the flat arcuate section b or a flat portion of the arcuate section Q of the carrier 9b in the upper portion of FIG. 2) which is flat.

FIGS. 4a and 4b show a portion of a modified carrier 109 wherein all such parts which are identical with or clearly analogous to corresponding parts of a carrier 9a or 9b are denoted by similar reference characters plus 100. The carrier 109 comprises six radially extending sections or portions A, B, C, D, E, F each of which has a tongue 118. The tongues 118 of the sections B, D and F are flexed toward the flat portion of the confronting carrier (not shown in FIGS. 4a and 4b) through a distance corresponding to the full extent of axial movability of the carrier 109. The extent of flexing of the tongues 118 can be seen in FIG. 4b.

The carrier 109 comprises tongues 118, 117, 119 corresponding to those described in connection with the topmost carrier 9b of FIG. 2 and an additional tongue 125 which is provided in the inner arcuate section or portion d in line with the flexed tongues 118, 117 of the radially extending section B. The tongue 125 is provided in the region of the undulation 121 and is flexed toward the flat portion of the non-illustrated confronting carrier which is installed back-to-back with the illustrated carrier 109. The tongue 125 is adjacent the extension 117d of the cutout 117c. The carrier 109 is affixed to the associated carrier by rivets 112a, 112b, 122a and 122b.

A hole or opening 124 can receive a portion of a balancing rivet.

FIGS. 5a and 5b show a third carrier 209. All such parts of this carrier which are identical with those of the carrier 9b shown in the upper portion of FIG. 2 are denoted by similar reference characters plus 200. Pairs of confronting carriers 209 of the type shown in FIGS. 5a and 5b can be utilized with advantage in smaller-diameter clutch plates. The radially extending portion or section F of the carrier 209 includes a tongue 118 which is flexed toward the adjacent radially extending section (A) of the confronting carrier (not shown in FIGS. 5a and 5b). The flexed tongue 218 of the section F is radially outwardly adjacent a flexed tongue 217. The tongue 19 in the radially extending portion or section F of the carrier 9b shown in the upper portion of FIG. 2 is omitted in the carrier 209 because such tongue would strike the undulation 221 in the section A of the non-illustrated carrier which confronts the carrier 209 of FIGS. 5a and 5b.

Figure 6:
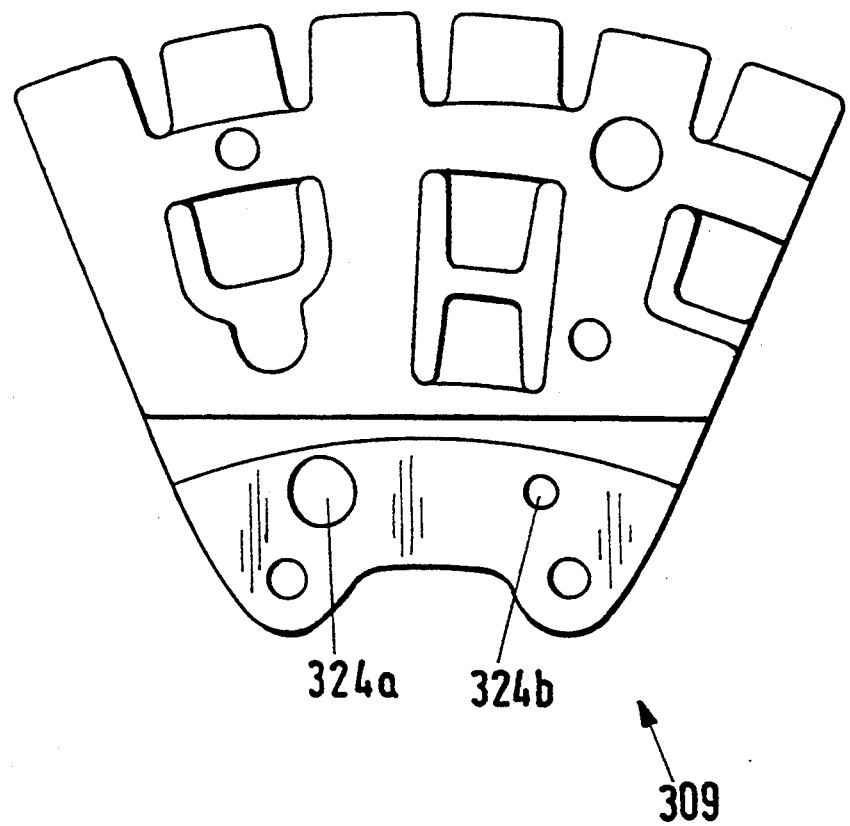
FIG. 6 is an elevational view of a fourth carrier which can be utilized in the improved clutch plate.

The carrier 309 of FIG. 6 is similar to the carrier 209 of FIGS. 5a and 5b. It is further provided with openings or holes 324a, 324b for one or more balancing rivets, not shown. The second head of a balancing rivet is outwardly adjacent the hole 324b, and the hole 324a receives with clearance the first head of a balancing rivet so that such rivet cannot interfere with axial movability of adjacent portions of two confronting carriers 309 toward and away from each other. This renders it possible to manipulate the balancing rivets in the same way as already described with reference to clutch plate 1 of FIGS. 1 to 3.

FIGS. 7a to 7d illustrate the details of a carrier 409 which constitutes a further modification of the carriers 9 and 9b. All such parts of the carrier 409 which are identical with or clearly analogous to corresponding parts of the carrier 9b shown in the upper portion of FIG. 2 are denoted by similar reference characters plus 400. The opening or hole 417d for the rivet 412b does not constitute an extension (note the extension 17d in FIG. 2) of the adjacent C-shaped or U-shaped cutout 417c for the flexed tongue 417 of the radially extending portion or section B. Furthermore, the arcuate section d including the undulation 421 is provided with a slot-shaped opening 426 which is formed in the section B radially inwardly of the flexed tongue 417 and discrete opening or hole 417d. A differently configured opening 427 is provided in that portion of the arcuate section d which forms part of the radially extending section E. The purpose of the openings 426 and 427 is to enhance the flexibility (i.e., resiliency) of the corresponding portions or sections of the carrier 409, particularly to enhance the resiliency of the arcuate section or portion d. The shape and/or the dimensions of the opening 426 and/or 427 can be varied within a wide range to thus influence the resiliency of the corresponding portion or portions of the carrier 409.

The openings 426 and 427 render it possible to flex the carrier 409 in the region of the arcuate section d in response to the exertion of a relatively small force. Thus, the overall area of the arcuate section d is reduced. This is desirable in certain clutch plates in order to reduce the specific stressing of friction linings (i.e., the bias of the carriers) in the radially innermost portions of the friction linings. In this manner, the specific stressing of friction linings (per unit area) at the radially innermost portions of such linings can match or approximate the specific stressing of radially outer or outermost portions of the friction linings. The just described design is desirable and advantageous when the space between the inner and outer diameters of the friction linings is relatively narrow, i.e, when the extent of flexibility of friction linings in such region is rather limited.

Figure 7A:
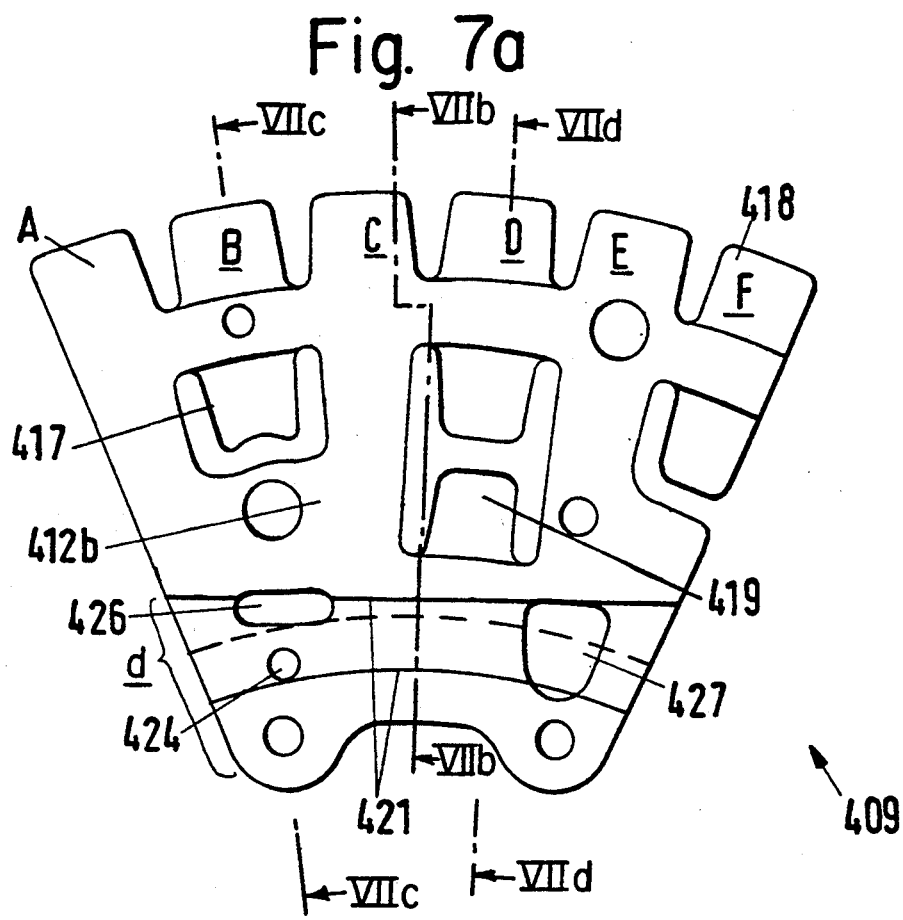
FIG. 7a is an elevational view of a fifth carrier which can be utilized in the improved clutch plate.
Figure 7B:
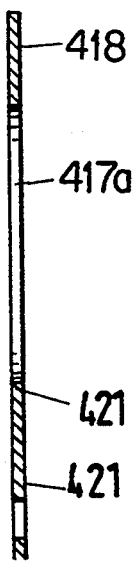
Figure 7C:
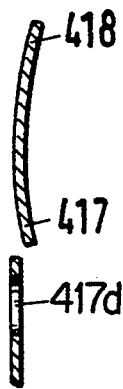
Figure 7D:

The hole or opening 424 which is shown in FIG. 7a serves to receive a portion of a balancing rivet.

The section d is disposed radially inwardly of the friction linings (not shown in FIGS. 7a to 7d) and includes a radially inner portion which is affixed to the ring 2 (not shown in FIGS. 7a to 7d) and an outer portion which is provided with the openings 426, 427 serving to promote the flexibility of the respective part of the carrier 409.

Figure 8A:
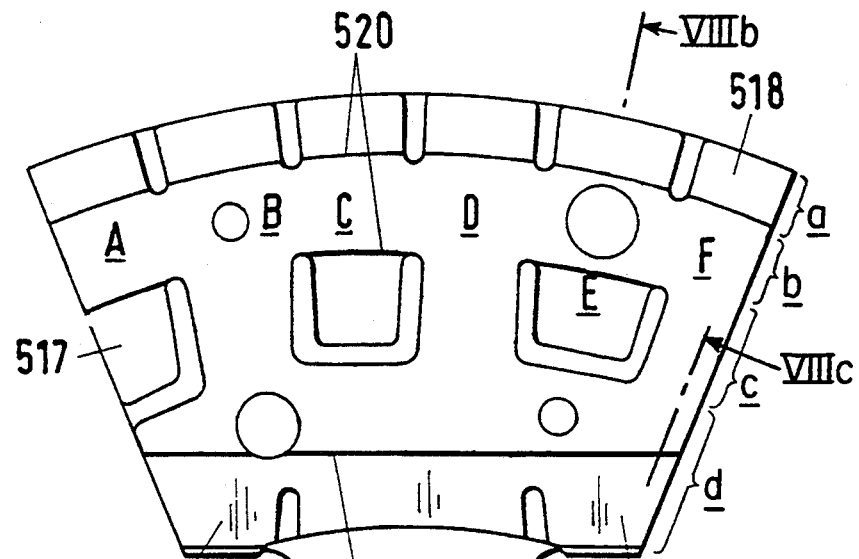
FIG. 8a is an elevational view of a sixth carrier which can be utilized in the improved clutch plate.
Figure 8B:
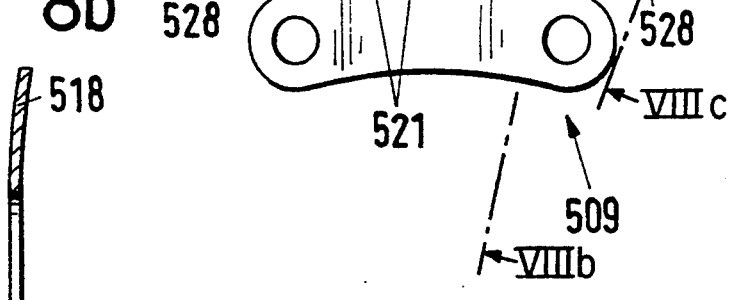
Figure 8C:
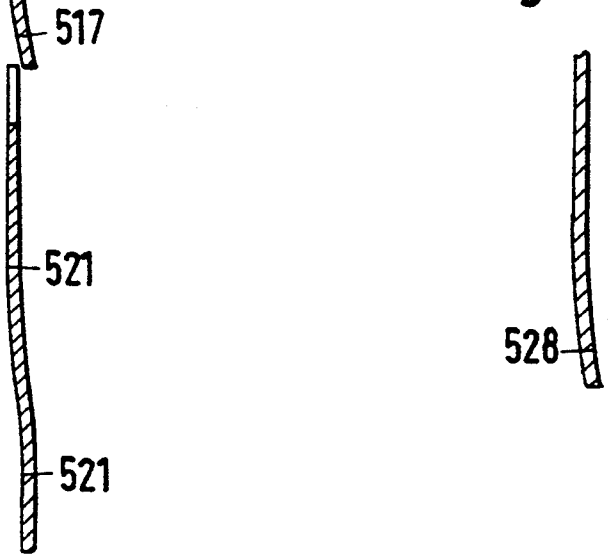

Referring to FIGS. 8a to 8c, there is shown a carrier 509 with six flexed tongues 518, one in each of the six radially extending sections A to F. The extent of flexing corresponds to half the axial movability of the carrier 509. The tongues 518 are flexed in a direction toward the adjacent rear or inner side of the confronting carrier (not shown in FIGS. 8a to 8c). The radially outer arcuate section a of the carrier 509 (i.e., the section composed of the six flexed tongues 518) is adjacent an arcuate section a which forms part of the flat portion of the carrier 509, and the section b is outwardly adjacent an arcuate section c having a width (as measured radially of the carrier 509) which suffices to provide the flexed tongues 517, one in each of the radially extending sections A, C and E and each bounded by a U-shaped or L-shaped cutout. The root or base portions 520 of the tongues 518 are located radially inwardly of their free end portions, and the root or base portions 520 of the tongues 517 are located radially outwardly of the respective free end portions. The base or root portions 520 are adjacent the arcuate section b. Such flexing of the tongues 518 and 517 contributes to more satisfactory distribution of stresses in the arcuate section b between the sections a and c of the carrier 509.

The arcuate section d of the carrier 509 comprises two additional flexed tongues 528 which are formed in the undulation 521 and are provided in the radially extending sections A and F. It will further be noted that the tongues 517 are provided in the radially extending sections A, C and E, that the radially extending sections B and D are provided with only tongues 518, and that each of the sections A and E includes a tongue 518 and a tongue 528. Thus, the distribution of flexed tongues departs considerably from that of flexed tongues in other embodiments of the improved carrier. It is further possible to modify the carrier 509 by leaving the tongues 518 of the radially extending sections B, D and F in the plane of the flat portion 509'.

FIGS. 9a and 9b show a carrier 609 wherein the radially extending sections A to F have discrete tongues 618 but only the tongues 618 of the sections B to F are flexed toward the flat portion of the confronting carrier (not shown). The arcuate section c has tongues 617 which form part of the radially extending sections B, D and F and are also flexed toward the flat portion of the confronting carrier. The arcuate section d includes the undulation 621 as well as four tongues including two flexed tongues 628 in the radially extending sections A and E and two unflexed tongues 629 in the radially extending sections B and F. The extent of flexing of the tongues 628 matches the full extent of resilient deformability of the carrier 609 in the axial direction of the clutch plate which employs the carrier of FIGS. 9a and 9b.

Figure 10:
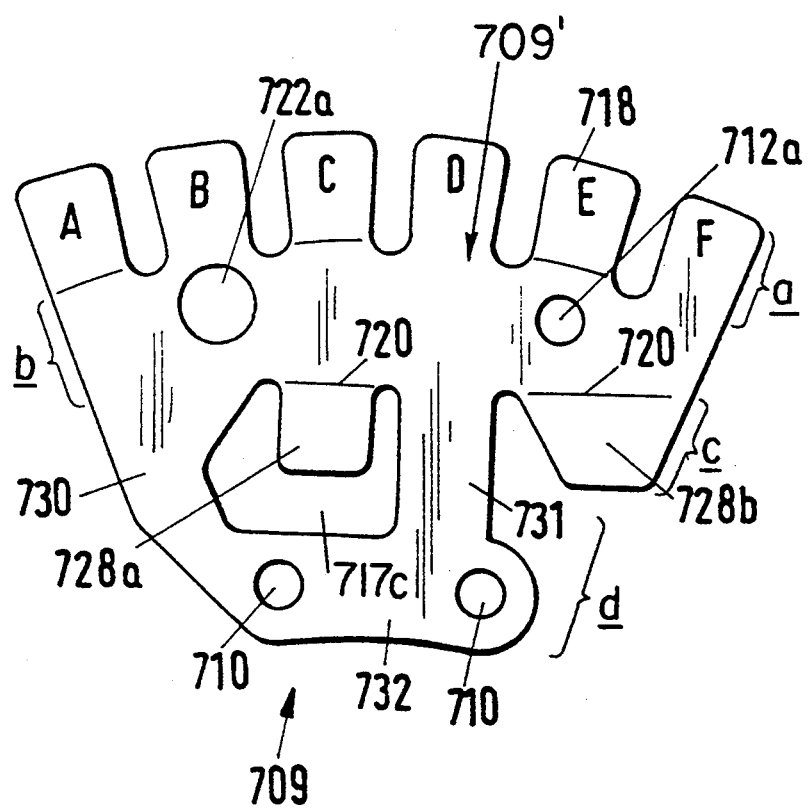
FIG. 10 is an elevational view of still another carrier which can be utilized in the clutch plate of the present invention.

All such parts of the carrier 709 of FIG. 10 which are identical with or clearly analogous to corresponding parts of the carrier 609 are denoted by similar reference characters plus 100. Each of the radially extending sections A to F is provided with a tongue 718 but only the tongues 718 of the sections A, C and E are flexed toward the flat portion of the confronting carrier (not shown). The extent of bending or deflection of the flexed tongues 718 at least matches the overall axial deformability of the carrier. If the carrier 709 is modified to have six flexed tongues 718, each such tongue is flexed to an extent matching or approximating half the deformability of the carrier in the axial direction of the respective clutch plate.

The radially outermost arcuate section a of the carrier 709 is adjacent an arcuate section b which forms part of the flat portion 709' of the carrier 709 and is provided with holes or openings for rivets 712a and 722a serving to secure the carrier 709 to the confronting carrier and to the two friction linings (not shown in FIG. 10). The arcuate section b is outwardly adjacent an arcuate section c having two flexed tongues 728a, 728b alternating with parts or spokes 730 and 731 of the flat portion 709'. The flat parts or spokes 730, 731 are provided in the radially extending sections A and D, and the flexed tongues 728a, 728b are provided in the radially extending sections C and F. Actually, the width of the tongue 728b exceeds the width of the section F so that this tongue extends into the neighboring section E. The flat parts 730, 731 merge into a flat part 732 constituting the radially innermost arcuate section d and having openings or holes for rivets 710 which affix the carrier 709 to a disc corresponding to the disc 2 of FIGS. 1 and 2. The part 732 can be said to constitute a connection between the flat parts 730, 731 in the arcuate section c of the carrier 709. The latter is further provided with a cutout 717c which surrounds three sides of the flexed flap 728a in the radially extending section C and is flanked by the flat parts 730 and 731. The base portion 720 of the tongue 728a is adjacent the arcuate section b and the free end of this flexed tongue is adjacent the innermost section d. The orientation of the flexed flap 728b is the same as that of the flap 728a, i.e., the base 720 of the flap 728b is also adjacent the arcuate section b and the free end of this flap is nearer to the axis of the clutch plate embodying the carrier 709.

When the carrier 709 is assembled with an identical carrier back-to-back, the tongue 728a of the illustrated carrier bears against the flat part 731 of the confronting carrier and the tongue 728b of the illustrated carrier bears against the flat part 730 of the confronting carrier. The extent of deformation of the tongues 728a, 728b in the axial direction of the clutch plate embodying carriers 709 of the type shown in FIG. 10 then at least matches the maximum axial deformability of a carrier.

It will be seen that the left-hand rivet 710 is offset with reference to the flat parts or spokes 730 and 731, and that the right-hand rivet 710 is offset relative to the part 730 and partially relative to the part 731, all as seen in the circumferential direction of the disc 2 on which the carrier 709 is mounted. FIG. 10 further shows that the two rivets 710 are offset relative to the adjacent parts 730, 731 in the same direction, again as seen in the circumferential direction of the disc (namely Q to the right as viewed in FIG. 10).

The improved clutch plate is susceptible of numerous additional modifications. For example, the features of various illustrated embodiments can be combined in a number of ways without departing from the spirit of the invention. Furthermore, at least some features of the improved clutch plate, as well as of the carriers and/or other components of such clutch plate, are believed to be of a nature which renders them patentable per se.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction-operated torque transmitting device comprising:
   a rotary hub;
   a disc coaxial with and affixed to said hub and having an outer diameter;
   two annular friction linings coaxial with said hub and having inner diameters greater than said outer diameter;
   an annulus of pairs of confronting substantially sector-shaped resilient discrete carriers disposed axially between said linings and secured to said disc, said carriers having substantially flat portions and each of said carriers having a plurality of substantially radially extending tongues partly cutout and projecting from the flat portions, at least one tongue of at least one carrier of each pair being located opposite a flat portion of the other carrier of the respective pair; and
   means for fastening said carriers to said linings, including means for fixing the carriers of said pairs to each other in axially stressed condition.

2. The device of claim 1, wherein said fastening means comprises a plurality of rivets for each pair of said carriers, each of said rivets having external shoulders engaging the carriers.

3. The device of claim 1, wherein each of said fixing means connects the flat portion of one carrier to the flat portion of the other carrier of the respective pair of carriers.

4. The device of claim 1, wherein each of said carriers includes a part which is overlapped by said friction linings, the ratio of the flat portion to the overlapped part of each of said carriers being at least 40 percent of the overlapped part.

5. The device of claim 4, wherein said ratio is between 40 and 70 percent.

6. The device of claim 1, wherein a flat portion of each of said carriers is larger than the sum of the tongues of the respective carrier.

7. The device of claim 1, wherein each of said carriers includes an even number of radially extending sections having at least substantially identical sizes, said sections of each of said carriers including sections forming part of the respective flat portions and alternating with sections provided with said tongues.

8. The device of claim 1, wherein each of said carriers includes a plurality of arcuate sections extending circumferentially of said hub and including at least one section forming part of the respective flat portion and at least one section having at least one tongue.

9. The device of claim 8, wherein said sections of each of said carriers include a radially outermost section which is provided with at least one tongue.

10. The device of claim 9, wherein said sections of each of said carriers further include an inner section devoid of tongues and immediately radially inwardly adjacent the respective radially outermost section.

11. The device of claim 8, wherein said sections include a first section forming part of the respective flat portion and being devoid of tongues and a second section disposed radially inwardly of said first section and having at least one pair of tongues one of which is aligned with and is disposed radially outwardly of the other of said at least one pair of tongues.

12. The device of claim 11, wherein said tongues of each of said pairs have free ends adjacent each other.

13. The device of claim 1, wherein at least one carrier of each of said pairs includes at least one tongue which is flexed toward a tongue of the other carrier of the respective pair.

14. The device of claim 1, wherein at least one carrier of each of said pairs includes at least one tongue which is flexed toward and contacts a tongue of the other carrier of the respective pair.

15. The device of claim 1, wherein at least one carrier of each of said pairs includes at least one tongue which is flexed toward and contacts an unflexed tongue of the other carrier of the respective pair.

16. The device of claim 1, wherein said tongues of each said carriers include radially inner tongues and radially outer tongues and each of said carriers further comprises a section disposed radially inwardly of the respective radially inner tongues and forming part of the respective flat portion.

17. The device of claim 16, wherein each of said sections forms an arc of a circle.

18. The device of claim 1, wherein each of said carriers comprises a radially outer section extending circumferentially of the hub, a radially inner section extending circumferentially of the hub, and radially extending sections connecting said inner and outer sections, said sections forming part of the flat portion of the respective carrier.

19. The device of claim 1, wherein each of said carriers comprises an even number of radially extending sections including sections forming part of the respective flat portions and alternating with sections having tongues.

20. The device of claim 1, wherein the carriers of each of said pairs are at least substantially identical and are fixed to one another back-to-back.

21. The device of claim 1, wherein said tongues extend at least substantially in a radial direction of said hub.

22. The device of claim 1, wherein said tongues are deformed axially along an arc of a circle in a radial direction of said hub.

23. The device of claim 1, wherein an extent of flexing of said tongues exceeds an extent of axial movability of the respective carriers.

24. The device of claim 1, wherein said carriers have openings for balancing elements, said openings being disposed radially inwardly of said friction linings and radially outwardly of said disc.

25. The device of claim 24, wherein the balancing elements include rivets.

26. The device of claim 24, wherein each balancing element is affixed to one of a pair of carriers.

27. The device of claim 26, wherein one carrier of each pair has a relatively small first opening and the other carrier of each pair has a relatively large second opening in register with the respective first opening, each of said balancing elements comprising a rivet having a first head adjacent the first opening and a second head adjacent the second opening of the respective registering first and second openings.

28. The device of claim 1, wherein each of said carriers includes a radially innermost section secured to said disc and radially outwardly extending parts disposed radially outwardly of said radially innermost section, said radially outwardly extending parts including radially outermost portions forming part of the flat portions of the respective carriers and extending along a circular arc.

29. The device of claim 28, wherein each of said carriers includes two radially outwardly extending parts.

30. The device of claim 28, wherein said radially outwardly extending parts of each carrier bound a cutout and one tongue of the respective carrier is partially surrounded by such cutout.

31. The device of claim 28, wherein at least one radially outwardly extending part of each of said carriers is adjacent one end of a carrier part which is secured to said disc.

32. The device of claim 28, wherein at least one radially outwardly extending part of each of said carriers is offset in a circumferential direction of said hub with reference to an opening provided in the respective carrier for a rivet which secures the carrier to said disc.

33. The device of claim 32, wherein each radially outwardly extending part of each of said carriers is offset relative to a corresponding opening.

34. The device of claim 33, wherein said radially extending parts of each of said carriers are offset in a same direction with reference to the corresponding opening.

35. The device of claim 1, wherein said fastening means comprises a plurality of rivets for each pair of carriers, each of said rivets including means for connecting one carrier of the respective pair to one of said friction linings.

36. The device of claim 1, wherein each of said carriers is movable axially of said hub through a predetermined distance and includes a radially inner section which is deformed axially of said hub through approximately one-half of said distance.

37. The device of claim 36, wherein said radially inner sections of said carriers are undulated.

38. The device of claim 1, wherein each of said carriers includes a radially inner section including a radially inner portion affixed to said disc and a radially outer portion having at least one opening to promote a flexibility of said section, said section being disposed radially inwardly of said friction linings.

39. The device of claim 1, wherein at least one of each pair of carriers includes at least one flexure promoting opening which is disposed radially outwardly of said disc and radially inwardly of said friction linings.

40. The device of claim 39, wherein said at least one opening is elongated in the circumferential direction of said hub.

41. The device of claim 1, wherein said fastening means comprises two pairs of rivets for each pair of carriers, the rivets of one pair being mirror images of rivets of the other pair with reference to a plane including the axis of said hub and disposed midway between said two pairs of rivets, the rivets of each pair including a radially outer rivet and a radially inner rivet and each of said carriers having a plurality of radially extending sections including first sections with flexed tongues and second sections, each of said rivets connecting a first section of one carrier with a second section of the other carrier of the respective pair of carriers.

42. The device of claim 41, wherein each of said rivets has a stepped shank and the radially outer rivet of each pair of rivets is inverted through 180° with reference to the radially inner rivet of the respective pair of rivets.

43. A friction-operated torque transmitting device comprising:
a rotary hub, said hub having a circumferential direction;
a disc coaxial with and affixed to said hub and having an outer diameter;
two annular friction linings coaxial with said hub and having inner diameters greater than said outer diameter;
an annulus of pairs of confronting substantially sector-shaped resilient discrete carriers disposed axially between said linings and secured to said disc, said carriers having substantially flat portions and substantially radially extending tongues partly cutout and projecting from the flat portions, each of said carriers comprising a plurality of tongues and at least one tongue of at least one carrier of each pair is located opposite a flat portion of the other carrier of the respective pair, each of said carriers is movable axially of said hub through a predetermined distance and includes a radially inner section which is deformed axially of said hub through approximately one-half of said distance; and
means for fastening said carriers to said linings, including means for fixing the carriers of said pairs to each other in axially stressed condition.

* * * * *